United States Patent Office 3,386,859
Patented June 4, 1968

3,386,859
POROUS ELECTRODE COMPRISING HYDROPHOBIC BINDER AND HYDROPHILIC MATERIAL INCORPORATED THEREIN AND METHOD OF FABRICATING SAME
Royce E. Biddick, Edina, Minn., assignor, by mesne assignments, to Union Oil Company of California, Los Angeles, Calif., a corporation of California
No Drawing. Filed Nov. 4, 1964, Ser. No. 408,724
12 Claims. (Cl. 136—120)

This invention relates to a novel type of fuel cell electrode and to a method of preparing fuel cell electrodes. The embodiments of this invention are also directed to new and useful improvements in gas-diffusion electrodes.

In recent years fuel cells have received considerable attention in the continuing quest for improved sources of electrical energy. A fuel cell is an electrochemical device in which part of the energy of a chemical reaction is converted directly into direct-current electrical energy. One of the most significant advantages of fuel cells over conventional methods of generating electricity is the directness by which chemical energy is converted into electrical energy. This direct conversion of energy eliminates the necessity of converting energy into heat thereby avoiding the Carnot-cycle efficiency limitation. Other possible advantages of fuel cells are quietness, cleanliness and the reduction or the complete elimination of moving parts.

In general a fuel cell electrochemically generates electricity by deriving electrical energy from a chemical reaction maintained by a continuous supply of a different reactant in effective proximity to each of two electrodes disposed in spaced relationship to an electrolyte. According to one theory, the operation of a typical fuel cell utilizing an aqueous alkaline solution as the electrolyte, an oxidant is continuously introduced at the oxidant electrode (cathode) where it contacts the electrolyte and forms ions thereby imparting positive charges to the cathode. Simultaneously a reductant is continuously introduced at the fuel electrode (anode) where it forms ions and leaves the anode negatively charged. The ions formed at the respective electrodes migrate in the electrolyte and unite while the electrical charges imparted to the electrode are utilized as electrical energy by connecting an external circuit across the electrodes. For example, in the case of an oxygen-hydrogen fuel cell the hydroxyl ions that are formed at the cathode and the hydrogen ions that are formed at the anode migrate across the aqueous alkaline electrolyte and unite to form water.

The classification of the fuel cell reactants as oxidants and reductants is made on the basis of the electron donor and the electron acceptor characteristics of the reactants in any given system. Illustrative of reactants which have been heretofore proposed or used are oxidants such as pure oxygen; oxygen containing gases, e.g., air; halogens, e.g., chlorine; and reductants such as hydrogen, carbon monoxide, natural gas, methane, ethane, formaldehyde, and methanol.

The electrolyte of the fuel cell serves as the electrochemical connection between the electrodes and is required to prevent transfer of the reactants away from the respective electrodes where the formation of explosive mixtures can occur. The electrolyte utilized must not react directly to any appreciable extent with the reactants or reaction products formed during the operation of the fuel cell and it must permit the migration of the ions formed during the operation of the fuel cell. Depending on the system under consideration, examples of electrolytes that can be utilized are aqueous solutions of strong bases, such as alkali metal hydroxides, aqueous solutions of acids, such as sulfuric acid and hydrochloric acid, aqueous salt electrolytes such as sea water, fused salt electrolytes, and ion exchange membranes.

The electrodes of this invention are suitable for use in any cell of the aforedescribed type employing an aqueous electrolyte and a liquid or gas fuel. Cells of this type ordinarily will not be operated above about 600° F. or below about 70° F. and will operate at pressures in the range of about 1 to about 50 atmospheres. The electrodes of this invention may also be used in the so-called pocket fuel cells where an anode is in an envelope of two cathodes and an electrolyte-fuel mixture, maintained in an obsorbent separator, is fed to the anode surfaces and to one of each of the cathode surfaces while oxygen or air is fed to the exposed surfaces of the cathodes.

When a gaseous reactant is employed in a fuel cell having a liquid electrolyte, the area where the electrochemical activity occurs is that area wherein the electrolyte, the reactant gas, and the electrode catalyst are simultaneously exposed to each other. For this reason the most efficient fuel cell electrodes known have been made with a laminated or porous structure comprising an electron conductor and a catalyst to accelerate the rate of reaction. Ordinarily an electrode of this type comprises a porous conducting base impregnated with the catalytic material.

The prior art has long recognized the problem of electrode flooding by an aqueous electrolyte. While the problem is particularly prevalent in cells where electrodes, comprising non-metallic materials, e.g., porous carbon, are used the problem of catalyst poisoning and electrode flooding also prevails and presents a serious problem in other type electrode structures, i.e., wherein porous metal or metallic screening is the conductive support or substrate.

In each of the types of electrodes utilized in fuel cells the over-all efficiency is dependent, as previously indicated, upon obtaining a high incidence of three-phase contact between gas, liquid, and solid necessary for electrochemical reaction. For the electrodes to function properly, the porous base must provide a group of pores of sufficient diameter to allow the reactant gas to occupy, a large amount of the pore volume in opposition to the forces tending to flood such areas with the liquid electrolyte without the use of unduly high gas pressures. These pores, however, also have practical upper limits, as exceedingly large pores permit the oxidizing gas to bubble off into the electrolyte solution. In addition to these larger pores, a second group of much smaller pores is necessary. In these smaller pores the forces of capillary action allow the electrolyte to occupy the pore space in opposition to the gas pressure. Where the liquid-filled smaller pores connect with the larger gas-filled pores an area of three-phase contact is established. If catalytic material is present at this junction the desired electrochemical reaction takes place. If, however, the liquid electrolyte enters not only the smaller pores but also encroaches the larger pores, necessary for gas distribution, the electrode becomes flooded with electrolyte; the necessary three-phase contacts are diminished and the desired electrochemical reaction is either reduced or terminated.

The prior art has sought to alleviate the problem of electrode flooding by depositing hydrophobic materials and in particular halogen containing polymers in the pores of the electrodes. Exemplary are the fluorocarbon polymers, e.g., polytetrafluoroethylene, polytrifluoroethylene, polyvinyl fluoride, polyvinylidene fluoride, polytrifluorochloroethylene, and copolymers of different fluorofluorocarbon monomers, e.g., copolymers of tetrafluoroethylene and hexafluoropropylene. This procedure known in the art as wetproofing has found great success with "Teflon," a tetrafluoroethylene fluorocarbon resin marketed by E. I. du Pont de Nemours & Co., Inc. However, as indicated earlier a three-phase contact is always necessary and treatment with these polymers can result in overwetproofing of the electrode such that it may take days or even weeks before the electrode reaches its peak activity. Means to obtain peak electrode efficiency by forced wetting by application of pressure on the electrolyte or by extreme polarization have not proved to be entirely satisfactory.

It has now been discovered that better wetting of the electrode can be obtained by incorporating in the electrode hydrophilic materials such that the rate of activation of the electrode increases, with longer life of the electrode at high activity. The novel electrodes of this invention, wherein a hydrophilic or wettable material forms part of the body of the electrode, permits the electrolyte to be adsorbed or absorbed into the electrode body even where the electrode is hydrophobic in nature, and in those instances where a catalyst is desired and the catalyst has been pretreated with a hydrophobic material before formation into the electrode body, greater diffusion of the electrolyte occurs. In the preferred method of treating the catalyst of the electrode with a material such as "Teflon," the wettable material in the electrode permits electrolyte absorption thereby permitting a very high area of three-phase contact because of fingering of the electrolyte in the catalyst-gas zone. With the novel electrodes of this invention a higher gas pressure may be retained by the electrode without the gas bubbling therethrough.

This invention is also based upon the discovery that a superior electrode may be fabricated by first wetproofing the catalyst with a hydrophobic material and thereafter mixing the treated catalyst with hydrophilic fibers or porous hydrophilic material and thereafter applying the mixture of treated electrochemically reactive catalyst and hydrophilic material to an electrically conductive substrate or support such that the fabricated electrode body has wettable material substantially coextensive with the fabricated electrode body.

Therefore it is an object of this invention to provide improved fuel cell electrodes.

Still another object of this invention is to provide an improved process of preparing electrodes.

A further object of this invention is to provide a superior fuel cell electrode wherein the body of the electrode has incorporated therein a hydrophilic material substantially coextensive therewith.

A further object of this invention is to provide a superior active gas-diffusion electrode.

A further object of this invention is to provide a method of preparing an electrode utilizing an electrochemical catalyst that has been treated with a hydrophobic material whereby electrolyte flooding of the catalyst is substantially reduced.

A still further object of this invention is to provide a fuel cell utilizing at least one electrode prepared in accordance with this invention.

These and further objects of this invention will be described or will become apparent as the description herein proceeds.

While the invention will be described specifically in relation to a fuel cell system utilizing a gaseous reactant, those skilled in the art will readily appreciate its application to those systems utilizing liquid hydrocarbon and oxygenated hydrocarbon fuels and it is to be understood that the description of this invention is not to be limited to the embodiment which is specifically described.

The embodiments of this invention are applicable to the normal or ordinary type of carbon electrode and are particularly directed to an electrode having a porous metal or metallic screen substrate or support. However, in the preferred application of this invention a catalyst is employed and may be any of the catalytic materials heretofore successfully demonstrated in the art such as a metal of groups I-B, IV-B, V-B, VI-B, and VIII of the periodic table, manganese, mixtures of such elements, and inorganic compounds containing at least one of such elements and oxygen. The sulfides of such metals also provide desirable catalytic effects. Catalysts which may be used effectively include Au, Ag, Pt, Pd, Rh, Ir, oxides of the transition metals, e.g., MnO, CoO, NiO, etc., or mixtures of the aforedescribed.

The amount of catalyst depends mainly on whether or not it is supported on a carrier, such as activated carbon, or whether or not it is mixed with a diluent such as graphite or metal powder. The more expensive catalysts will normally and practically necessitate the use of a support or diluent. Where the conducting base and catalyst of the electrode are not one and the same, the supported or diluted catalytic material will usually constitute between 0.1 and 30 weight percent of the completed electrode. The percentage will vary within this range in accordance with the catalytic component employed. For example, when a noble metal such as platinum or palladium is employed the impregnated electrode will usually contain between 0.1 and 5 weight percent of the catalyst whereas when other metals are used the catalyst will usually comprise about 1–30 weight percent and preferably 5–15 weight percent of the electrode. However, with a catalyst such as silver, a diluent may or may not be employed and the silver may comprise as much as 95 weight percent of the electrode. The substrate or electrically conductive suppport preferably is a metal wire screen fabricated of the known electrically conductive metals such as stainless steel, nickel, tantalum, platinum, titanium, silver, niobium, etc.; having a mesh size from about 20 to 400 per inch.

The wetproofing materials or binders used in fashioning the electrode body are those known in the art and include hydrocarbons, substituted hydrocarbons, silicones and halogen-containing polymers such as the fluorocarbon polymers previously mentioned. Of the fluorocarbon polymers an aqueous "Teflon" emulsion is preferred. Other materials or resins that yield a hydrophobic surface and are satisfactory wet-proofing agents are "Kynar," a vinylidene fluoride resin marketed by Pennsalt Chemical Corporation, and "Viton A," a copolymer of hexafluoropropylene and vinylidene fluoride marketed by the Du Pont Company.

The following examples are illustrative of several of the embodiments of this invention.

Example I

A catalyst-Teflon slurry was prepared by mixing 0.8 gm. of −200 mesh $Ag_2O$ with water and an aqueous emulsion of Teflon particles (Du Pont TFE 30B) containing 0.08 gm. of Teflon solids. This slurry was dried at 110° for 16 hours. A portion of the dried mixture was spread onto a 2 cm. x 2 cm. 40 mesh nickel screen to form an electrode, and this electrode was heated at 330° C. for 15 minutes. The finished electrode contained 105 mg. of $Ag_2O/cm.^2$.

Example II

A second electrode was prepared in the same manner as the electrode of Example I except that Gooch grade asbestos, which had been shredded through a 10 mesh screen, was added to the dried mixture before spreading onto the nickel screen. Gooch grade asbestos is a very fine asbestos material commonly used in filtering procedures. The asbestos comprised 2 weight percent of the finished electrode. This electrode contained 82 mg. of $Ag_2O/cm.^2$.

The electrodes were tested as oxygen electrodes in 6 M KOH electrolyte at 25° C. using a counter electrode of sintered nickel. Oxygen pressure was less than 0.3 p.s.i. Current density was adjusted to maintain a potential of −0.4 v. versus a saturated calomel reference electrode which contacted the electrolyte by means of a salt bridge, the tip of which was 1 cm. from the electrode.

The electrode containing asbestos was more active and had a longer life as shown in the following table:

TABLE I

| Example | Electrode | ma./cm.² | Time During Which C.D. Dropped by 20%, Hrs. |
| --- | --- | --- | --- |
| I | Without asbestos | 45 | 1,270 |
| II | With asbestos | 87 | 1,860 |

Example III

A slurry was prepared by mixing one gm. of −200 mesh palladium black with water and an aqueous emulsion of Teflon particles (Du Pont TFE 30B) containing 0.1 gm. of Teflon solids. The slurry was dried at 110° C. for 24 hours. The dried mixture was spread onto 80 mesh stainless steel screen and pressed at 3600 p.s.i. to form an electrode. This electrode was then heated at 340° C. for 15 minutes. The electrode contained 82 mg. of $Pd/cm.^2$.

Example IV

A second electrode was prepared in the same manner as the electrode of Example III except that "Celite" (a calcined diatomaceous earth sold by Johns-Manville Company) was added to the dried mixture before spreading onto the screen. This electrode contained 71 mg. of $Pd/cm.^2$. The fabricated electrode contained 3.5 weight percent of "Celite."

These electrodes were tested as oxygen electrodes in 6 N $H_2SO_4$ electrolyte at 25° C. using a counter electrode of titanium plated with platinum. Oxygen pressure was less than 0.3 p.s.i. Current density was adjusted to maintain a potential of +0.5 v. versus a saturated calomel reference electrode which contacted the electrolyte by means of a salt bridge, the tip of which was 1 cm. from the electrode. Before testing, the electrodes were "activated" electrolytically. The electrode containing "Celite" was more active and had a longer life as shown in the following table:

TABLE II

| Example | Electrode | ma./cm.² | Time During Which C.D. Dropped by 20%, Hrs. |
| --- | --- | --- | --- |
| III | Without Celite | 80 | 192 |
| IV | With Celite | 98 | 430 |

The hydrophilic materials referred to throughout this specification and appended claims are construed to mean, those materials which tend to form fluid-conducting paths which may or may not be fibrous in nature. For instance, materials contemplated herein are asbestos, glass wool, synthetic fibers such as "Dynel" or nylon, Celite, porous silica or alumina, fiberous silica or alumina, kieselghur or diatomaceous earth, zirconyl phosphate, and other known hydrophilic materials which are inert under fuel cell operating conditions considering the temperatures, electrolytes and fuels utilized in said operation. The hydrophilic material may also be metallic, preferably porous or fibrous as for example finely divided Mond nickel formed by the decomposition of nickel carbonyl vapor. Other fibrous and powdered metals of tantalum, platinum, titanium, silver, niobium, etc., may also be used.

No criticality is claimed, except as herein indicated, in the manner of applying the impregnant, comprising catalyst and hydrophilic material, to the substrate or electrically conductive support which may be either porous carbon, porous metal sheet or wire mesh screen fabricated from those metals heretofore disclosed and other materials known to those skilled in the art.

Where the electrode body is fabricated from carbonaceous material, the pore size, surface area, density, etc., are matters within the skill of one in the art and will not be delved into here, it being only important that the electrode body have incorporated therein a hydrophilic material comprising about 0.5 to 25% of the total volume of said electrode body. The substrate itself need not contain any hydrophilic material but desirably where this is the case the hydrophilic material will be admixed with the catalyst before application to the substrate.

Similarly where a wire substrate is used the wire mesh support or screen may be of 20 to 400 mesh and the hydrophilic material forming a part of the electrode body may be of 10 to 325 mesh size. The catalyst may or may not be wet-proofed with a hydrophobic material prior to mixing same with the hydrophilic material but if the hydrophilic material is applied as a liquid or as an emulsion it is preferred to wetproof the catalyst before admixture with the hydrophilic material so that the hydrophilic material will not have its wettability decreased. The wetproofing materials may be dissolved in a solvent and applied to the catalyst as a solution provided the solvent is evaporated before the treated catalyst is admixed with the hydrophilic material. The preferred weight ratio of hydrophobic material to catalyst is within the range of 1:50 and 1:1 and depending upon ultimate application, the substrate support may be impregnated on one or both side with the prepared catalyst-hydrophilic material mixture. The treated substrate may subsequently be subjected to a compressive compacting process utilizing pressures sufficient to form a coherent mass usually 25 p.s.i. to 36,000 p.s.i. After compacting, the treated support may then be heated at temperatures sufficient to cause some fusion of the solid hydrophobic material so that upon cooling the hydrophobic material will act as a binding agent, care being taken that exceedingly high temperatures are not utilized so as to cause decomposition of substrate, catalyst, binder, hydrophilic or hydrophobic materials. With a hydrophobic material such as "Teflon" the preferred temperature range will be about 320°–350° C.

No novelty is claimed as to the specific types of substrates or electrically conductive supports utilized or in the catalyst used in the preparation of the electrodes except in so far as the novel wetproofing step of the catalyst is concerned before its incorporation with the hydrophilic material prior to electrode forming which will render the electrode more easily wettable, thereby obtaining sustained peak activity of the electrode in fuel cell operation.

Although this invention has been described in relation to specific embodiments, it will be apparent that modification can be made by one skilled in the art without departing from the intended scope of this invention as defined by the appended claims. For example, the method of this invention is applicable to both anodes and cathodes for fuel cells utilizing gaseous or liquid reactants.

The embodiments of the invention in which an exclusive property or privilege is claimed are defined as follows:

1. In an electrochemically reactive porous electrode comprising a body of electrically conductive substrate having adhering thereto a layer including catalyst particles and a hydrophobic binder comprising a fluorocarbon resin, the improvement in which said layer also includes a filler of asbestos fibers incorporated therein to form fluid-conducting paths substantially coextensive with said body.

2. The electrode in accordance with claim 1 wherein said electrically conductive substrate is selected from the group consisting of carbon and metallic wire mesh screen, or fibrous metal mat, said screen or mat being fabricated from a metal of the group consisting of stainless steel, nickel, tantalum, palladium, platinum, titanium, silver and niobium.

3. The electrode in accordance with claim 2 wherein said catalyst is selected from the group consisting of group I-B, IV-B, V-B, and VIII metals and compounds thereof.

4. The electrode in accordance with claim 3 wherein said catalyst has a coating of fluorocarbon resin, whereby said catalyst is substantially wetproofed.

5. A method of producing an electrochemically reactive porous electrode comprising the steps of:
(a) treating electrochemical catalyst particles with a hydrophobic material comprising a fluorocarbon resin;
(b) mixing the treated catalyst with asbestos fibers comprising at least 0.1 weight percent of said catalyst to obtain a pliable mixture; and
(c) applying an adherent layer of said pliable mixture to an electrically conductive support.

6. The method in accordance with claim 5 wherein said hydrophobic material is an aqueous dispersion of fluorocarbon polymer particles and said catalyst comprises at least one member selected from the group consisting of groups I–B, IV–B, V–B, VI–B and VIII elements of the periodic table.

7. The method in accordance with claim 6 wherein said electrically conductive support is a wire mesh screen fabricated from a metal selected from the group consisting of stainless steel, nickel, platinum, palladium, tantalum, titanium, silver and niobium.

8. The method in accordance with claim 7 wherein said layer of the pliable mixture and said support is subjected to a compressive force of about 25 p.s.i. to 36,000 p.s.i.

9. The method in accordance with claim 8 which additionally includes heating at a suitable temperature for a period of time sufficient to cause bonding between said layer of the pliable mixture and said support.

10. The method of fabricating an electrochemically reactive porous electrode comprising the steps of:
(a) treating an electrochemical catalyst with an aqueous emulsion of a fluorocarbon polymer to obtain a mixture, said catalyst being present in an amount not less than .0001 gram per square centimeter of the fabricated electrode, the weight of said catalyst to said polymer emulsion being within the range of about 50:1 to 1:1;
(b) allowing said mixture to dry to a pliable paste and thereafter mixing said paste with about 0.1 to 25 weight percent, of said paste, of 10 to 325 mesh size asbestos fibers;
(c) applying the resultant mixture of step (b) to a 20 to 400 mesh metal screen;
(d) subjecting said treated screen to a compressive force of about 25 p.s.i. to 36,000 p.s.i., and thereafter
(e) heating said screen at a temperature of about 150 to 350° C. for about 1 minute to 1 hour.

11. The method in accordance with claim 10 wherein said metal screen is nickel.

12. The method in accordance with claim 10 wherein said metal screen is stainless steel.

References Cited

UNITED STATES PATENTS

| | | | |
|---|---|---|---|
| 3,328,205 | 6/1967 | Barber et al. | 136—86 |
| 3,020,327 | 2/1962 | Ruetschi | 136—86 |
| 3,097,116 | 7/1963 | Moos | 136—120 |
| 3,113,048 | 12/1963 | Thompson | 136—120 |
| 3,134,697 | 5/1964 | Niedrach | 136—86 |
| 3,203,834 | 8/1965 | Breiner | 136—120 |
| 3,215,562 | 11/1965 | Hindin | 136—120 |
| 2,924,634 | 2/1960 | Fischbach et al. | 136—86 |
| 3,234,050 | 2/1966 | Beltzer et al. | 136—86 |
| 3,248,267 | 4/1966 | Langer et al. | 136—86 |

FOREIGN PATENTS

| | | |
|---|---|---|
| 935,415 | 8/1963 | Great Britain. |
| 938,708 | 10/1963 | Great Britain. |
| 1,296,819 | 5/1962 | France. |

WINSTON A. DOUGLAS, *Primary Examiner.*

ALLEN B. CURTIS, *Examiner.*

A. SKAPARS, *Assistant Examiner.*